United States Patent [19]

Matsuura et al.

[11] Patent Number: 4,791,001

[45] Date of Patent: Dec. 13, 1988

[54] METHOD FOR GRINDING SOYBEANS AND METHOD FOR PRODUCING TOFU

[75] Inventors: Masaru Matsuura; Akio Obata; Norikazu Fujii, all of Noda; Akio Nobuhara, Kasukabe; Danji Fukushima, Omiya, all of Japan

[73] Assignee: Kikkoman Corporation, Noda, Japan

[21] Appl. No.: 2,274

[22] Filed: Jan. 12, 1987

[30] Foreign Application Priority Data

Jan. 14, 1986 [JP] Japan ................... 61-4282

[51] Int. Cl.$^4$ .................... A23J 3/00; A23L 1/20
[52] U.S. Cl. ...................... 426/634; 426/401; 426/407; 426/412; 426/431; 426/507; 426/518; 426/656
[58] Field of Search ............... 426/634, 656, 598, 507, 426/431, 474, 392, 401, 407, 412, 518

[56] References Cited

U.S. PATENT DOCUMENTS

| | | | |
|---|---|---|---|
| 4,000,326 | 12/1976 | Okada et al. | 426/126 |
| 4,105,803 | 8/1978 | Peng | 426/634 |
| 4,140,811 | 2/1979 | Ogasa et al. | 426/634 |
| 4,209,541 | 6/1980 | Clatfeller et al. | 426/518 |
| 4,321,280 | 3/1982 | Roy et al. | 426/598 |
| 4,514,433 | 4/1985 | Matsuura | 426/634 |
| 4,537,789 | 8/1985 | Sugisawa et al. | 426/634 |
| 4,636,398 | 1/1987 | Matsuura | 426/634 |
| 4,673,583 | 6/1987 | Kuwata et al. | 426/634 |
| 4,678,677 | 7/1987 | Sugisawa et al. | 426/598 |

FOREIGN PATENT DOCUMENTS

| | | | |
|---|---|---|---|
| 0011258 | 1/1979 | Japan | 426/518 |
| 0099170 | 7/1980 | Japan | 426/634 |
| 0050941 | 12/1981 | Japan | 426/634 |
| 0134963 | 8/1983 | Japan | 426/598 |
| 0179045 | 10/1984 | Japan | 426/598 |
| 0047648 | 3/1985 | Japan | 426/598 |
| 0083558 | 5/1985 | Japan | 426/634 |
| 0118158 | 6/1985 | Japan | 426/634 |
| 0118159 | 6/1985 | Japan | 426/634 |
| 0057818 | 12/1985 | Japan | 426/634 |
| 1031058 | 2/1986 | Japan | 426/598 |
| 2155751 | 10/1985 | United Kingdom | 426/634 |

OTHER PUBLICATIONS

A. K. Smith et al, "Soybean or Vegetable Milk", Chemical Engineering News, 1946, pp. 54–56.

*Primary Examiner*—David L. Lacey
*Assistant Examiner*—N. Manoharan
*Attorney, Agent, or Firm*—Banner, Birch, McKie & Beckett

[57] ABSTRACT

This invention relates to a method for grinding soybeans by grinding soaked soybeans together with a predetermined amount of water to obtain a soybean slurry which method comprises grinding the soaked soybeans in the presence of 10 to 30% by volume of air relative to the total weight of the soaked soybeans and the water, and also to a method for producing retort or aseptic packed tofu using the soybean milk obtained by the method of grinding.

14 Claims, 1 Drawing Sheet

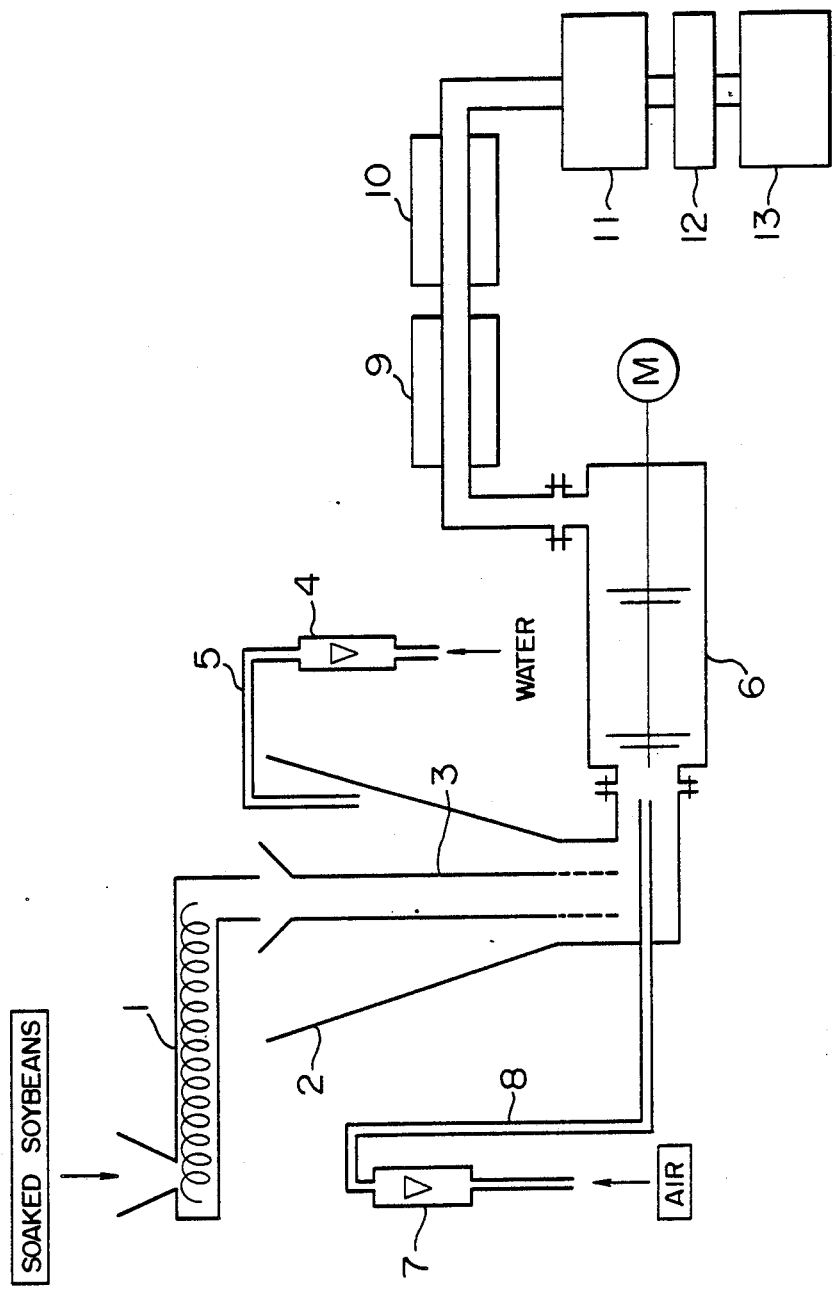

METHOD FOR GRINDING SOYBEANS AND METHOD FOR PRODUCING TOFU

BACKGROUND OF THE INVENTION

1. Field of the Invention

This invention relates to a method for grinding soybeans, particularly a method for grinding soybeans suitable for obtaining a soybean milk used for retort or aseptic packed tofu, and also to a method for producing retort or aseptic packed tofu using the soybean milk obtained by said method of grinding.

2. Description of the Prior Art

Soybean milk, which is the raw material of tofu, can be obtained by grinding soaked soybeans together with water in an amount of 3 to 4 times the weight of soybeans, and then filtering the resulting soybean slurry. The grinders generally used in production of tofu are mainly of the open type, such as stone mills and vertical grinders, in which grinding is performed while a large amount of air is being caught up by the machine.

On the other hand, horizontal grinders, when used properly, can be operated so as to prevent air from being caught up therein, and thus to prevent the oxidation of soybeans during grinding.

SUMMARY OF THE INVENTION

The present inventors have investigated, as a part of the studies on the method for producing tofu, the relation between the presence of air during grinding and the quality of soybean milk obtained, and resultantly found that when the grinding is conducted in the presence of a certain amount of air, the soybean milk obtained is white in color and evolves relatively little hydrogen sulfide ($H_2S$) on heating.

Further, it has been found that when said grinding is conducted at a low temperature, namely when grinding is conducted at a low temperature in the presence of a certain amount of air, the soybean milk obtained has an increased content of sulfhydryl (SH) groups leading to the improvement of the gelling ability of soybean milk, and resultantly a retort packed tofu with good texture can be obtained; and also the formation of dimethyl sulfide (DMS) during retorting is suppressed and resultantly a retort packed tofu can be obtained which is free from a disagreeable odor characteristic of conventional retort packed tofu.

This invention has been accomplished on the basis of the above findings. The present invention provides a method for grinding soybeans by grinding soaked soybeans together with a predetermined amount of water which comprises grinding soaked soybeans in the presence of 10 to 30% by volume of air relative to the total weight of soaked soybean and water, and also a method for producing tofu which comprises using as a raw material a soybean milk obtained by following the said method of grinding at a low temperature.

BRIEF DESCRIPTION OF THE DRAWING

The attached drawing is a schematic diagram showing the grinding system used in Experimental Examples and Examples of this invention.

1: Screw feeder, 2: Hopper, 3: Guide cylinder, 4: Flow meter, 5: Water flow-in pipe, 6: Grinder, 7: Flow meter, 8: Air blow-in pipe, 9: Heater, 10: Cooloer, 11: Filter, 12: Deaerator, 13: Soybean milk tank.

DETAILED DESCRIPTION OF THE INVENTION

The soybeans used in this invention can be either whole soybeans or dehulled soybeans used for conventional tofu. They are soaked in water at 20° to 50° C. for 2 to 16 hours. Particularly, the soybeans are preferably removed, prior to grinding, of at least 45%, preferably 50% or more, of the soluble saccharides contained therein.

The soluble saccharides, as referred to in this invention, are the water-soluble saccharides which are leached out from the soybeans when the beans are soaked or ground in water. The total amount of the soluble saccharides is determined in the following manner.

The starting soybeans are soaked in a predetermined quantity of water, then ground together with the soaking water, and filtered to obtain a soybean milk as the filtrate. The soybean milk is adjusted to pH 4.5 with hydrochloric acid to precipitate protein, which is then separated by centrifugation. The supernatant is assayed for the saccharide content by the method of phenol-sulfuric acid, and the result is expressed in terms of glucose content.

The soluble saccharides can be removed by soaking the starting material soybeans in water. To remove 45% or more of the soluble saccharides, the soybeans are soaked at 50° to 60° C. for 6 to 8 hours in the case of whole soybeans, and at 20° to 30° C. for 6 to 8 hours or at 40° to 60° C. for 2 to 3 hours in the case of dehulled soybeans. To minimize the flavor of oxidized lipids, it is desirable to soak the soybeans at a temperature in the range where the activity of lipoxidase is restrained, for example at a temperature of 40° C. or above. In an example of preferred embodiments, the dehulled soybeans are soaked at 45° to 55° C. for 2 hours or thereabout.

In leaching the soluble saccharides into cold or hot water from whole or dehulled soybeans, it is desirable to use as far as practicable the soybeans as they are without exerting any injury to the cotyledon or other parts of the soybeans, because if the cells of soybeans are ruptured by crushing or cracking of whole or dehulled soybeans, there will develop disagreeable odor or taste and will also occur leaching of proteins together with saccharides, leading to the increased loss of proteins.

The soaked soybeans thus obtained are then ground together with water in an amount of 3 to 4 times the weight of the soybeans. According to this invention, said grinding is conducted in the presence of 10 to 30% by volume of air relative to the total weight of soaked soybeans and water.

To grind the soybeans in the presence of a predetermined amount of air, it is preferable to use a horizontal grinder, since the amount of air present is difficultly controlled in grinders of stone mill type or vertical type. Specifically, it is possible to conduct the grinding in the presence of 10 to 30% by volume of air by blowing air directly into a grinder 6, as shown in the attached drawing.

Further, the grinding is favorably conducted at a low temperature of 15° C. or below, preferably 10° C. or below, whereby the amount of SH groups in the soybean milk is increased, the gelling ability of the milk is enhanced, the formation of DMS during the retort treatment is suppressed, and thus a retort packed tofu free from a disagreeable odor is obtained.

The low temperature grinding can be conducted by such means as charging the soaked beans into the grinder together with cold water or with cold water and ice.

The temperature of the cold water charged together with soaked beans is 15° C. or below, preferably 10° C. or below, when heat generation during grinding and other factors are taken into consideration. If necessary, the grinder itself may be cooled.

In grinding the soybeans, the addition of a small amount of monoglyceride improves the efficiency of protein extraction. Further, the addition of a small amount of sodium ascorbate or tocopherol inhibits oxidation and favorably affects the retort treatment conducted at a high temperature, resulting in tofu which has more agreeable flavor.

The following Experimental Examples are presented to demonstrate the effectiveness of the presence of air during grinding and of low temperature grinding.

EXPERIMENTAL EXAMPLE 1

Soybeans were ground by using the apparatus shown in FIG. 1 and the procedure described below. The resulting soybean slurry was heated and then filtered to obtain soybean milk.

Soaked whole soybeans obtained by soaking the soybeans at 25° C. for 16 hours are fed by means of a screw feeder 1 into a guide cylinder 3 which is provided in a hopper 2 and whose lower part is constructed of a perforated plate. Water is fed into the hopper through a flow meter 4 and a pipe 5. During the time, the soaked soybeans and water are fed such that no air enters into the horizontal grinder 6 from the hopper side, namely that the level of water in the hopper 2 is always maintained higher than the grinder 6.

On the other hand, air is directly fed into the grinder 6 through a flow meter 7 and a pipe 8 by means of an air pump or the like (not shown in the Figure).

The soybeans are thus ground in the grinder 6 in the presence of air to give soybean slurry. The soybean slurry is heated in a heater 9 at 90° C. for 30 seconds, then cooled in a cooler 10 down to a temperature of 60° C. or below, and filtered through a filter 11 to separate beancurd refuse, and the filtrate is deaerated in a reducedpressure tank 12, to obtain soybean milk 13.

The color of the soybean milk and the amount of hydrogen sulfide formed on heating the milk are shown in Table 1.

TABLE 1

| No. | Amount of air blown in | Color*1 | | | | Visual observation | Hydrogen sulfide*2 |
| --- | --- | --- | --- | --- | --- | --- | --- |
| | | L | a | b | w | | |
| 1 | 10% | 79.81 | −1.79 | 14.85 | 74.87 | White | 0.155 |
| 2 | 20% | 79.20 | −1.49 | 14.08 | 74.84 | White | 0.095 |
| 3 | 30% | 79.30 | −1.50 | 14.27 | 74.81 | White | 0.039 |
| 4 | 40% | 79.09 | −1.46 | 14.26 | 74.65 | Light pink | 0.011 |
| 5 | Control (0) | 80.32 | −2.10 | 15.97 | 74.57 | Yellow | .0.233 |

Note:
*1Determined with a color and color difference meter (mfd. by Nippon Denshoku Kogyo K. K.)
*2Each sample of soybean milk was sealed in a glass tube with deaertion, heated by steaming at 130° C. for 60 seconds, and then assayed according to the method of Taniguchi (Analytical Biochem., 40, 200 (1971)). The values shown in the Table refer to absorbance at 660 nm.

As is apparent from Table 1, the method according to this invention gives a soybean milk which is white in color and evolves relatively little amount of $H_2S$ when heated.

Soybean milk No. 4 obtained at an amount of air blown in of 40% are somewhat defective in color and odor (odor due to oxidation).

EXPERIMENTAL EXAMPLE 2

Dehulled soybeans were soaked in water at 45° for 2 hours, washed with water, and then ground by using the apparatus shown in FIG. 1, while the grinding temperature was being adjusted to the temperature shown in Table 2.

The soybean slurry thus obtained was heated at 95° C. for 2 minutes, then cooled down to 65° C., and filtered through a 100 mesh sieve to obtain soybean milk.

The soybean milk was deaerated, then adjusted to a protein concentration of 5%, and filled into a retort pouch. The pouch was then tightly sealed and subjected to retort treatment at 120° C. for 30 minutes.

The amount of SH-groups, DMS, and $H_2S$ in these soybean milk samples thus prepared are shown in Table 2. The SH group was determined with the soybean milk before the retort treatment, and DMS and $H_2S$ were determined with the soybean milk after the retort treatment.

TABLE 2

| Sample No. | Grinding temp. (°C.) | Amount of air in grinding (%) | SH group*1 | DMS*2 | $H_2S$ |
| --- | --- | --- | --- | --- | --- |
| 1 | 5 | 0 | 0.587 | 4 | 0.452 |
| 2 | 10 | 0 | 0.510 | 10 | 0.450 |
| 3 | 15 | 0 | 0.430 | 40 | 0.374 |
| 4 | 25 | 0 | 0.352 | 100 | 0.316 |
| 5 | 45 | 0 | 0.276 | 160 | 0.300 |
| 6 | 10 | 30 | 0.495 | 10 | 0.022 |

Note:
*1(SH group content): The SH group content was determined according to the method of ELLMAN by developing color with DTNB [5,5′-dithiobis(2-nitrobenzoic acid)] reagent and measuring the developed color intensity with a Hitachi Type-557 dual wave length recording spectrophotometer and expressed in terms of absorbance at 412 nm.
*2(DMS content): The DMS content was determined according to the head space gas collection method of Sasaki, Nunomura et al. (J. Chem. Soc. Japan, 5, 736 (1981)) by using a Type-GC4B gas chromatograph provided with a flame photometric detector (mfd. by Shimadzu Corp.). The content was indicated in the unit of ppb.

As is apparent from the results shown in Table 2, soybean milk samples (Nos. 1 to 3) prepared at a grinding temperature of 15° C. or below have a higher content of SH groups and produce a smaller amount of DMS on heating.

In sample 6, prepared by grinding at 10° C. in the presence of 30% of air, the $H_2S$ content decreases to 1/20 of that in sample 2, prepared by grinding in the absence of air.

From these results, it can be concluded that the most preferable soybean milk for use as the starting material retort packed tofu is the one obtained by low temperature grinding in the presence of 10 to 30% of air.

The soybean slurry obtained by grinding is then heated at 95° to 110° C. for 0.5 to 5 minutes, and filtered to separate into soybean milk and bean-curd refuse.

The heating of soybean slurry should be done as quickly as possible, preferably within 3 minutes, after the grinding. It is undesirable to leave the slurry standing for a long time because it causes the acceleration of syneresis during the retort treatment.

The soybean milk if necessary, is homogenized in a high pressure homogenizer and then deaerated. The soybean milk is then, if necessary, preheated at a high temperature for a short time, for example 1 to 5 seconds at 130° to 140° C. After cooling, the soybean milk is filled together with a coagulant into a container, which is then tightly sealed.

The preheating at a high temperature for a short time is desirable because it serves not only to destroy the heat-tolerant bacillus spores adhered to the soybeans but also to alleviate the conditions of heat sterilization in retort treatment, resulting in reduction of both discoloration and disagreeable flavor of the product tofu; moreover, the preheating has a repressive effect on the syneresis which tends to take place in retort treatment.

The container used should be a heat resistant one made of those resins which are generally used for cooked foods with retort packs, such as polyethylene, polypropylene, saponified ethylene-vinyl acetate copolymer, and polyvinylidene chloride. The coagulants are those which are generally used in the production of tofu, such as glucono delta lactone (GDL), calcium sulfate, calcium chloride, and magnesium chloride. These coagulants can be used each alone or in combination.

The soybean milk tightly sealed in the container together with the coagulant is then subjected to retort treatment to sterilize and coagulate the milk. The packed soybean milk may also be preheated, before the retort treatment, at an internal temperature of 60° to 95° C. by exposing it to steam or hot water, to produce a retort packed tofu less subject to syneresis.

The retort treatment may be performed by using a common retort sterilizer, the conditions therefore being 4 to 120 minutes at 110° to 140° C. After the retort treatment, the packed tofu is cooled, for example, with water to obtain the final product.

The retort packed tofu thus obtained is white in color, free of disagreeable flavor, and excellent in taste and texture.

Further, the present invention can also be applied to the production of aseptic packed tofu. In this case, the soybean milk separated from bean-curd refuse is heat-sterilized at 120° to 140° C., then mixed with an aseptic coagulant, for example an aqueous glucono-delta-lactone solution which has been aseptically filtered through a Millipore membrane filter, and then filled aseptically into a plastic container or the like which has been sterilized beforehand, the container is tightly sealed, and the packed mixture is heated at 70° to 100° C. to effect coagulation. Thus aseptic packed tofu is obtained.

On the other hand, in the above-mentioned process for producing retort packed tofu and aseptic packed tofu, when the procedure is followed without addition of any coagulant, aseptic soybean milk is obtained. It can be used as such as a drink. Also, it can be used as soybean milk for tofu production from which tofu can be easily obtained by adding to the milk a coagulant appended thereto as a separate package and then heating the resulting mixture.

This invention will be illustrated below with reference to Examples.

EXAMPLE 1

Into 50 liters of hot water at 50° C., was soaked 10 kg of dehulled soybeans. After soaking the beans for one hour while keeping the soaking temperature at 50° C., the soaking water was replaced by 40 l of fresh water at 50° C., and the soaking was continued for further one hour (2 hours of total soaking time) while the temperature being kept at 50° C. To the drained soybeans was added 80 g of monoglyceride. The soybeans were then ground by the use of the apparatus shown in the Figure while 40 liters of cold water at 5° C. was being added continuously and air was being blown into in an amount of 30% by volume relative to the total weight of soybeans and cold water. The grinder used was a Type LM-S grinder (mfd. by Tokushukika Kogyo Co.). The temperature of the soybean slurry during the grinding was 10° C.

Immediately after grinding, the soybean slurry was heated to 100° C. by means of a heater provided in the discharge pipe of the grinder, kept at the temperature for 30 seconds, then cooled to 80° C., and the slurry was filtered through a pressure filter provided with a 100 mesh screen. The filtrate was immediately cooled down in a reduced-pressure tank while removing the air to obtain a soybean milk.

The soybean milk was homogenized under a pressure of 300 kg/cm$^2$ (G) and discharged into a reduced-pressure tank to effect deaeration. The resulting soybean milk was preliminarily heat-sterilized at 138° C. for 2 seconds by means of a plate heater (Model P-20 of Alfa Laval Co.).

The soybean milk was then cooled to 25° C. by means of a plate cooler. To the cooled soybean milk, was added GDL to a concentration of 0.3%. The soybean milk was then filled in a heat resistant container, 64×64×32 mm (LAMICON CUP made from a saponification product of ethylene-vinyl copolymer, manufactured by Tokan Kogyo Co.), and the container was sealed tightly. The resulting packed soybean milk was preheated by steaming at 100° C. for 10 minutes and subjected to retort treatment at 120° C. for 30 minutes in a retort sterilizer (Model RCS 40 RTG of Hisaka Seisakujo Co.), and then cooled down to 25° C. in water to obtained retort packed tofu.

EXAMPLE 2

A soybean slurry obtained in a similar manner to that in Example 1 was heated to 105° C. by blowing steam into the slurry, then kept at the temperature for 30 seconds, cooled to 85° C., and thereafter treated in the same manner as in Example 1 to obtain a soybean milk. Without being subjected to preliminary heat sterilization, the soybean milk was mixed with GDL to a concentration of 0.3% then filled in a container, sealed tightly, subjected to retort treatment at 115° C. for 60 minutes, and cooled to obtain retort packed tofu.

EXAMPLE 3

A soybean milk obtained in the same manner as in Example 1 was heat-sterilized at 140° C. for 2 seconds, then cooled to 20° C. by means of a plate cooler, and stored in a sterile storage tank.

A coagulant solution prepared by aseptic filtration of an aqueous 25% GDL solution through a Millipore membrane filter (WS-b, a trade name, mfd. by Millipore Ltd.) was added to the sterilized soybean milk in a proportion of 1.0% by volume relative to the volume of the soybean milk. The resulting mixed solution was introduced into an aseptic atmosphere, then aseptically filled in a polypropylene container which had been sterilized beforehand with hydrogen peroxide, and the container was tightly sealed with a cap material which had been also sterilized with hydrogen peroxide. The packed soybean milk was immersed in hot water at 90° C. for 40 minutes to be coagulated. Thus, aseptic packed tofu was obtained.

EXAMPLE 4

A sterilized soybean milk obtained in the same manner as in Example 3 was introduced into an aseptic atmosphere, then aseptically filled in an aluminum pouch which had been sterilized beforehand with hydrogen peroxide, and tightly sealed to obtain aseptic soybean milk.

EXAMPLE 5

A soybean milk obtained in the same manner as in Example 1 was filled and tightly sealed in an aluminum pouch, then subjected to retort treatment at 120° C. for 25 minutes, and cooled to obtain retort packed soybean milk.

What is claimed is:

1. A method for grinding soybeans by grinding soaked soybeans together with a predetermined amount of water to obtain a soybean slurry which method comprises grinding the soaked soybeans at a temperature not higher than about 15° C. in the presence of 10 to 30% by volume of air relative to the total weight of said soaked soybeans and said water.

2. A method according to claim 1, wherein the soaked soybeans are those which had been removed of at least 45% of the soluble saccharides contained therein.

3. A method according to claim 1, wherein air is blown into the grinder and the soaked soybeans are ground in the presence of the air existing in the grinder.

4. A method for producing retort packed tofu which comprises the steps in sequence of (a) soaking dehulled soybeans in water at a temperature of 45° to 55° C. and a pH of 9 to 11 for a sufficient time to remove from the soybeans at least 45% of the soluble saccharides contained therein; (b) cooling said soaked soybeans and then grinding them at a temperature not higher than about 15° C. by using cold water at 10° C. or below in an amount 3 to 4 times the weight of the soybeans and in the presence of 10 to 30% by volume of air relative to the total weight of soaked soybeans and water to obtain a soybean slurry; (c) heating the soybean slurry at 95° to 110° C. and then filtering the slurry to separate it into soybean milk and bean-curd refuse; (d) deaerating the soybean milk, then adding a coagulant to the milk, filling the milk into a heat resistant container, and tightly sealing the filled container; and (e) subjecting the tightly sealed container to retort treatment to effect sterilization and coagulation of the soybean milk, and then cooling the container.

5. A method according to claim 4, wherein the dehulled soybeans are soaked in water at 45° to 50° C. for 90 to 150 minutes.

6. A method according to claim 4, wherein the temperature of cold water used in the grinding is 1° to 5° C.

7. A method according to claim 4, wherein the soaked soybeans are ground in the presence of air in a grinder by blowing air into the grinder.

8. A method according to claim 4, wherein the deaerated soybean milk is preliminarily heat-sterilized at 130° to 140° C. for 2 to 5 seconds by a plate heater.

9. A method according to claim 4, wherein the coagulant is a member selected from the group consisting of glucono-delta-lactone, magnesium chloride, calcium chloride, and calcium sulfate.

10. A method according to claim 4, wherein said retort treatment is a heat treatment conducted at 110° to 140° C. for 4 to 120 minutes.

11. A method according to claim 4, wherein the soybean milk is preheated by steam or hot water before retort treatment so that a temperature of the soybean milk becomes 60° to 95° C.

12. A method for producing aseptic soybean milk which comprises the steps in sequence of (a) soaking dehulled soybeans in water at a temperature of 45° to 55° C. and a pH of 9 to 11 for a sufficient time to remove from the soybeans at least 45% of the soluble saccharides contained therein; (b) cooling said soaked soybeans and then grinding them at a temperature no higher than about 15° C. by using cold water at 10° C. or below in an amount of 3 to 4 times the weight of the soybeans and in the presence of 10 to 30% by volume of air relative to the total weight of soaked soybeans and cold water to obtain a soybean slurry; (c) heating the soybean slurry at 95° to 110° C. and then filtering the slurry to separate it into soybean milk and bean-curd refuse; and (d) heat-sterilizing the soybean milk obtained.

13. A method according to claim 12, wherein the sterilization of soybean milk is effected by retort treatment at 110° to 140° C. for 4 to 120 minutes.

14. A method for producing aseptic packed tofu which comprises the steps in sequence of (a) soaking dehulled soybeans in water at a temperature of 45° to 55° C. and a pH of 9 to 11 for a sufficient time to remove from the soybeans at least 45% of the soluble saccharides contained therein; (b) cooling said soaked soybeans and grinding them at a temperature not higher than about 15° C. by using cold water at 10° C. or below in an amount of 3 to 4 times the weight of the soybeans and in the presence of 10 to 30% by volume of air relative to the total volume of soaked soybeans and cold water to obtain a soybean slurry; (c) heating the soybean slurry at 95° to 110° C. and then filtering the slurry to separate it into soybean milk and bean-curd refuse; (d) heat-sterilizing the soybean milk at 120° to 140° C.; (e) adding an aseptic coagulant to the sterilized soybean milk, filling the resulting mixture aseptically in a container, and tightly sealing the filled container; and (f) heating the container at 70° to 100° C. to effect coagulation of the soybean milk.

* * * * *